United States Patent [19]

Huber

[11] 4,420,682

[45] Dec. 13, 1983

[54] INTERACTIVE MAP INFORMATION EXCHANGE SYSTEM

[75] Inventor: William A. Huber, Sea Girt, N.J.

[73] Assignee: The United States of America as represented by the Secretary of the Army, Washington, D.C.

[21] Appl. No.: 360,272

[22] Filed: Mar. 22, 1982

[51] Int. Cl.³ .............................................. G06K 7/10
[52] U.S. Cl. .................................... 235/472; 235/462
[58] Field of Search .............................. 235/462, 472

[56] References Cited

U.S. PATENT DOCUMENTS 3,918,029 11/1975 Lemelson ............................ 235/472

OTHER PUBLICATIONS

William A. Huber, Research and Development Technical Report ECOM-4539, Sep. 1977.

*Primary Examiner*—Harold I. Pitts
*Attorney, Agent, or Firm*—Robert P. Gibson; Jeremiah G. Murray; Anne Vachon Dougherty

[57] ABSTRACT

Apparatus and a method for quickly and accurately exchanging tactical military information between military field units utilizing existing communications systems over which digital map data is transmitted. Special maps are used which have the coordinates thereof encoded thereon in machine-readable form. A stylus responsive to said digital map data is adapted to be moved over the coded map to facilitate the plotting of data points corresponding to said digital map data and to read the coordinates of data points to be transmitted as digital map data to other military units.

23 Claims, 16 Drawing Figures

INTERACTIVE MAP INFORMATION EXCHANGE SYSTEM

The invention described herein may be manufactured, used, and licensed by or for the Government for governmental purposes without the payment to me of any royalties thereon.

BACKGROUND OF THE INVENTION

The invention relates to a data transmission and recording system and more particularly to such a system designed to facilitate the exchange and recording of tactical military information between military units and to permit such information to be quickly and accurately plotted on maps. The system is interactive in that the information can flow in two directions, for example, from a higher echelon such as a command and control center to a field unit such as a company, using existing communications facilities; and other map information can be transmitted back to the command and control center using the same transmission facilities and the encoding apparatus of the present invention.

The system includes a processor module at the higher echelon which functions as an interface between the central processor of the higher echelon's computer and the communications system over which the map data is transmitted, and a field processor at the tactical field unit which interfaces with the communications channel and the stylus. The stylus is a device which is moveable by hand over the surface of an encoded map to locate the coordinates thereon at which data is to be plotted and for transmitting back to the processor module map information relating to tactical operations. The data sent to higher echelons is stored for later use and can be applied to display type maps and can be re-transmitted to other field units, if necessary, using the system of the present invention.

The incoming map data can be temporarily stored in the field processor and plotted at the field operator's convenience. The map data includes digitally coded map coordinates corresponding to the location on the map at which data is to be plotted. The maps are divided into a plurality of relatively large square map elements or mels and each mel is assigned a digital code according to its location along the x and y axes. The x and y coordinates of each mel are encoded on the back of the map in binary digital form, for example by printing two orthogonal codes thereon in magnetic ink. The stylus includes a coordinate code sensor which can read the mel codes as the stylus is moved over the map surface. The stylus is electrically connected to the field processor and it includes a digital display of the desired map coordinates. When the stylus has been moved to a proper coordinate, the display for that coordinate will indicate that the proper coordinate has been reached, for example by blinking.

Since greater resolution is desired than is practical with a hand-operated stylus and the relatively large mels, each mel is further subdivided into a plurality of sub-mels, and the system is designed so that the operator locates the proper mel as described above by hand, and then the proper sub-mel is located by means of a template and light emitting diode (LED) system attached to the stylus and electrically operated by several of the least significant of the binary digits read out of the field processor. This two stage system permits high resolution which would be otherwise impractical in a hand operated system.

The map coordinate sensors or transducers may take any one of numerous forms, however all comprise means to automatically sense the digital map mel codes and are capable of performing this function when moving across the map or when stationary. The underside of the stylus includes one or more magnets. The magnetic fields produced thereby are concentrated in the magnetic ink of the mel code bars to facilitate the reading thereof by the coordinate sensors.

SUMMARY OF THE INVENTION

The present invention provides for high accuracy, high resolution and high speed plotting and reading of information to and from maps by the use of a data reduction technique in which the digital code representing a map coordinate contains a sufficient number of bits, for example nine binary bit, to permit a resolution of 512 lines along each orthogonal map coordinate. This high resolution results in 262,144 square map elements which would be approximately 55 mils or 1/18 of an inch on a side for a typical map of $28 \times 28$ inches. Such a mel is too small to contain the required coordinate coding and also it would be difficult for an operator to locate the proper mel by manually moving a code sensor over such a coded map even if it could be coded to this resolution. To circumvent these difficulties, the present invention provides a system wherein the map is divided into much larger mels, for example, each of the x and y map axes may be divided into 64 equal parts. This results in 4,096 square mels. For the $28 \times 28$ inch map mentioned, each of these mels is then almost $\frac{1}{2}$ inch on a side. Since 64 is $2^6$, six binary digits are necessary to specify each of the x and y coordinates of each such mel. These six binary digits are encoded in magnetic ink on the back of the maps to facilitate automatic reading thereof by the coordinate code sensor which is part of the manually operated stylus. The binary code may consist of magnetic ink bars printed on the back of the map within each mel. Two orthogonal arrays of these code bars indicating the x and y coordinate of the mel are located within each mel.

Automatic apparatus forming part of the moveable stylus utilizes the remaining 3 bits of the 9 bit coordinate code to accurately locate the desired data plotting point on the map within the mel located by the operators movement of the stylus. In this example, with the 3 remaining binary digits of the 9 bit code, each mel can be broken down into 64 submels to obtain the aforementioned 512 line resolution. A template with an array of holes in orthogonal rows and columns together with an array of indicator lights along two adjacent sides of the hole array permits the map to be marked at the proper location in accordance with the three remaining bits.

The stylus includes a pair of orthogonally disposed coordinate code transducers or sensors for automatically and simultaneously reading the two x and y orthogonal mel codes printed in each mel of the map. These transducers are designed so that they can function when the stylus is in motion or stationary and are further designed so that each of the two x and y sensors each span more than the width of one mel but less than the width of two mels. Also the hole array template used to locate the proper sub mel covers more than the width of a single mel. These features in conjunction with appropriate circuitry means that the stylus need not be accurately positioned to read the desired mel and to permit accurate plotting of the desired sub-mel with the aid of the array template.

Three different types of coordinate code sensors are described which can be used in this system. The first is a surface acoustical wave device in which a surface acoustical wave is launched down a piezoelectric crystal which is oriented perpendicular to the array of code bars desired to be read. The surface of the crystal has a pattern of conductors printed thereon and a magnet in the stylus concentrates magnetic flux in the vicinity of the magnetic ink code bars. As the surface wave propagates down the crystal, the printed conductors are moved in such a way that a voltage will be induced therein if a code bar is under that portion of the crystal. The presence or absence of this voltage thus determines whether a 0 or 1 is read. The conductors on the piezoelectric crystal are located relative to wavelength of the propagating wave to maximize the induced voltage. Also an interdigital transducer is used to launch the surface acoustic wave.

An alternative type of coordinate code sensor may comprise an electro-optical transducer adapted to read the magnetized code bars. This sensor may comprise a solution such as Bitter's solution which changes optical density in the presence of a magnetic field. Light sources are reflected from the solution to phototransistors and the intensity of the reflected light is indicative of the presence or absence of a magnetized code bar on the underside of the map.

The third type of code sensor comprises an array of toroidal iron cores with air gaps therein. The presence of the magnetic ink code bars adjacent the air gap will cause an increase in inductance of a coil wound on the toroid. This sensor requires no magnets since the coil is part of a series resonant circuit which magnetizes the air gap. Thus the device is a variable reluctance device. The presence or absence of a code bar is determined by the phase shift of the current or voltage in the series resonant circuit. The circuit used provides large phase shifts for small current or voltage variations.

It is thus an object of the invention to provide an apparatus and method for quickly and easily plotting information on maps.

Another object of the invention is to provide a means of exchanging tactical military information between field units quickly and accurately utilizing existing communications systems and automated map coordinate reading and plotting apparatus.

A further object of the invention is to provide apparatus capable of accurately plotting information received in binary coded form on maps by printing coordinate codes on said maps, which codes can be automatically read by coordinate code sensors, and wherein said received binary code is compared to the code read by said sensors to indicate the proper location for the plotting of said information.

Another object of the invention is to provide apparatus capable of plotting information on maps with high accuracy from received binary digital information comprising a plurality of binary code words indicative of the data points to be plotted, and wherein the said binary code words are split into two groups, the first group comprising the more significant bits of said word and said first group being used in conjunction with a mannually operated stylus including a coordinate code sensor and coordinate codes printed on said maps to locate a relatively large map element or mel in which said data points are located, and further automated means to use the second group of the binary bits of lesser significance to accurately locate said data points within said mel.

A still further object of this invention is to provide a method and apparatus for plotting information on maps and for reading information therefrom in which the plotting and reading is accomplished in two stages, the first stage being the location by manually moveable means of the general area of the point to be plotted or sent by sensing coordinate codes printed on the maps within each said general area or mel and comparing this code to a portion of a binary code word which indicates the coordinate of said general area, and using the remainder of said binary code word in conjunction with further plotting apparatus to accurately locate the point to be plotted or read within said general area or mel.

A further object of the invention is to provide improved code sensors capable of sensing magnetic ink bar codes with high accuracy and sensitivity.

These and other objects and advantages of the invention will become apparent from the following detailed description and the drawings.

DETAILED DESCRIPTION OF A PREFERRED EMBODIMENT

Figure 1:
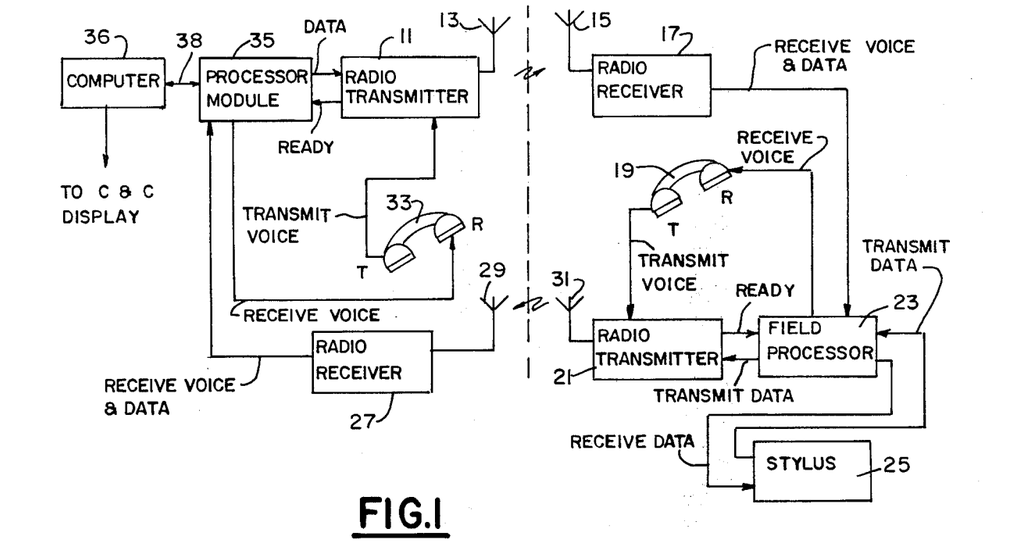
FIG. 1 shows how the system of the present invention can be integrated into an existing voice communications system.

FIG. 1 illustrates how the system of the present invention can be integrated into an Army voice communications system so that map information relating to tactical operations may be exchanged between forward area field units and higher echelons which are equipped with automatic data processing facilities. In FIG. 1 the circuitry to the right of the dashed line comprises that at the forward area tactical unit and that to the left the higher echelon, usually called a command and control center. The radio transmitters 11 and 21, the radio receivers 17 and 27 and the associated handsets 19 and 33 are part of the aforementioned duplex voice communications system. The function of the processor module 35 is to interface the digitally encoded display data with the communications system, taking into consideration such characteristics as time sharing, routing, data rates, system bandpass, logic, waveforms, etc. This interface must be two way so that the field operators can both receive and transmit to the higher echelon computer 36, as indicated by the double headed lead 38 between the computer 36 and processor module 35. The map data in the processor module is fed to the transmitter 11 during idle periods in the voice communication function, in response to a control signal on the lead labelled "ready". The map data received by receiver 17 together with the voice signals are applied to field processor 23 which applies the voice signals to handset 19 and stores the map data for application to the stylus 25 over the lead marked "receive data". In returning data to the higher echelon, the flow of data is reversed from the stylus to the field processor and transmitter 21 via the "transmit data" leads. The functions of the field processor are storage of map coordinate data, formatting the data for display and furnishing the necessary logic so that the operators can interact with the system with the aid of the stylus.

The aforementioned data reduction technique (or the two stage plotting and reading system) reduces the 262,144 elementary areas of a 512 line $\times$ 512 line resolution coordinate system to 4,096 mels (or 64 lines $\times$ 64 lines). This reduction is automatically accomplished by the field processor. The processor logic divides each of the 512 vertical and horizontal lines into 64 groups of 8 lines each. Each of the 64 groups derived from the 512 vertical lines is assigned a 6-bit code starting with (000000) and ending with (111111). This code group forms the x-axis coordinate of the 4,096 array of mels. Each group of 8 horizontal lines is binary coded in 64 binary numbes to form the y-axis coordinate of the mel array. The 3 remaining bits of the 9-bit data code are retained in the field processor memory for later recall and use by the operator to automatically subdivide each mel into 64 units, thereby providing the desired 512 $\times$ 512 line resolution.

Figure 2:
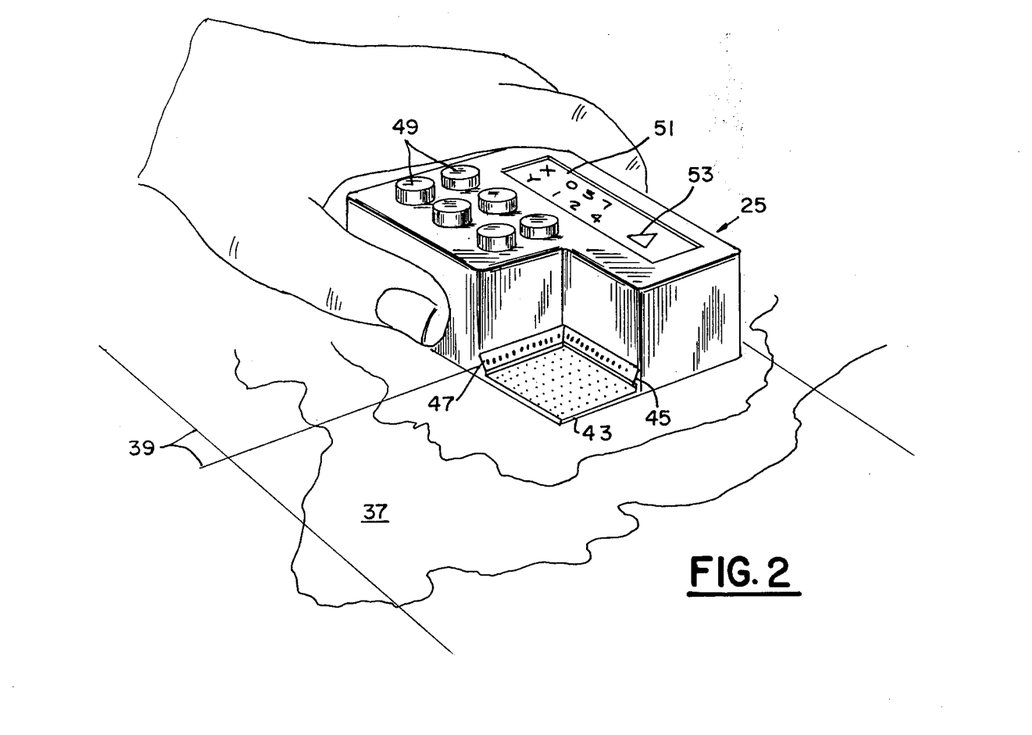
FIG. 2 is a pictorial view showing the stylus of the present invention as it is moved over the surface of a map.

FIG. 2 is a pictorial view showing how the stylus 25 is moved over the surface of the map 37 to locate the proper data points for the plotting and reading functions. The stylus includes a display of the desired map coodinates, 51, which shows both the x and y coordinates of the data point, in base 10 numbers, from 0-511. The triangular symbol 53 indicates the type of activity at the data point. For example, the triangular symbol may indicate "enemy tanks". Other symbols would have other meanings. The operator may mark such symbol on the map after the data point is plotted. The symbols form part of the data received by the field processor. The dials 49 are used for controlling the operations of the stylus. The stylus includes coordinate code sensors and magnets which will be shown and described in connection with other figures of the drawings.

The array template 43 is attached to one corner of the stylus and two orthogonal rows of lights 45 and 47, for example, LEDs are automatically illuminated to accurately locate the data point within the larger mel defined by using the 3 binary digits temporarily retained in the field processor memory during location of the mel by manual stylus operation. The operation of the array template will be explained in connection with FIG. 5.

Figure 3:
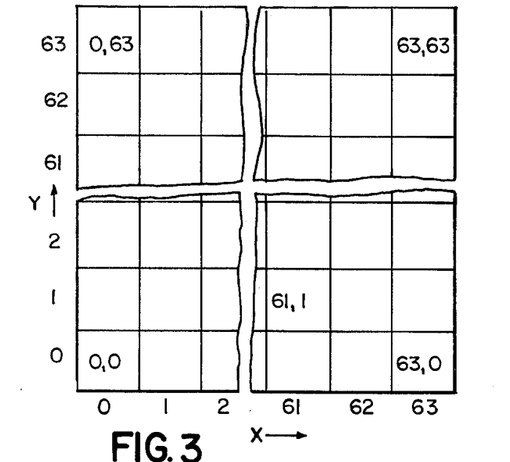
FIG. 3 shows a map divided into a plurality of mels.
Figure 4:
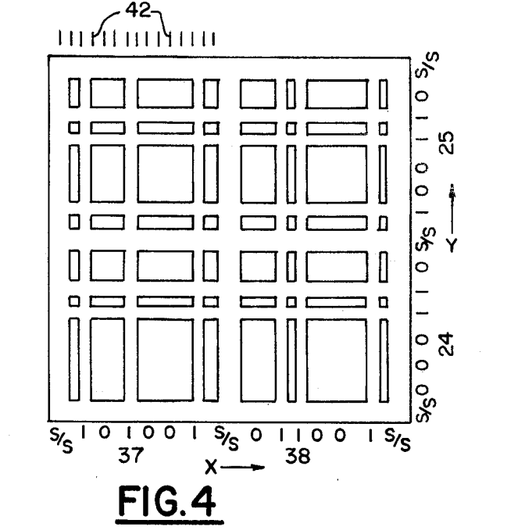
FIG. 4 shows how the orthogonal mel coding bars are arranged within four mels.

FIG. 3 shows how a square map can be divided into 4,096 mels, as explained above. Each of the x and y axes are evenly divided into 64 parts labelled 0 through 63. Thus each mel can be uniquely identified by a pair of six-bit binary numbers. For example the mel labelled 61, 61 is coded in binary as (111101), (000001). Each of the maps mels has two 6-bit binary codes printed thereon orthogonally in magnetic ink which can be automatically read by the stylus. FIG. 4 shows how these orthogonal codes are arranged. FIG. 4 shows four adjacent mels from near the center of the map. These mels have x coordinates 37 and 38 and y coordinates of 24 and 25. The magnetic ink bars can be printed on maps when they are made, or older type maps in the field can have the magnetic ink binary codes attached to the undersides thereof by adhesive means.

In FIG. 4, the x coordinate code bars are arrayed vertically within each mel. The first code bar of each binary code number is a double width start/stop bar labelled s/s. These start/stop bars defined the beginning and end of the 6-bit code and defines the boundaries of the mel. Each side of each mel is divided into 15 units. The first and second units are occupied by the double-width s/s bars, the third unit is a blank space, fourth a code bar space, the fifth a blank space, etc. Thus all of the odd numbered units, except the first are blank spaces between code bars and all even numbered spaces except the second are code bar spaces. This arrangement provides 6 code bar spaces. A bar in any of these 6 code bar even spaces indicates a weighted binary 1. In FIG. 4 in the lower left mel which has coordinates x=37 and y=24, there are three vertical code bars located at even spaces 4, 8, and 14. This corresponds to binary number 100101, reading from right to left, which corresponds to ten-based x coordinate 37. The marks 42 at the top of the upper left mel indicate the center of the 15 space units into which the mel is divided.

The orthogonally disposed y coordinates of the two lower mels of FIG. 4 comprises a pair of horizontal code bars positioned to indicate the binary number 011000 or 24. The coded bars of FIG. 4 are intended to be read by the sensors from right to left and from top to bottom and the coodinate code sensors in the stylus must be designed accordingly.

Figure 5:
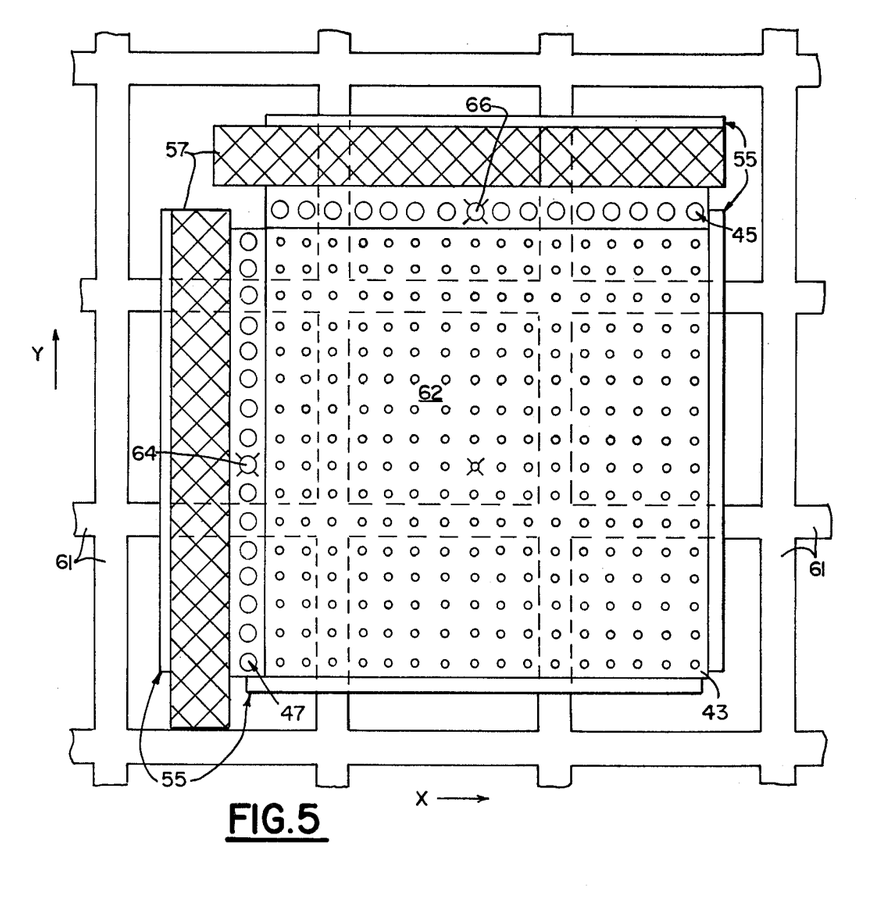
FIG. 5 is a plan view of the stylus over a coded map and showing the array template and other features of the stylus.

FIG. 5 is a top phantom view of the stylus shown resting on a map divided into mels by an orthogonal array of start/stop bars 61. The binary code bars within the mels are omitted for clarity. The significant functional components on the underside of the stylus are indicated in this figure. Four magnetizers 55 form a square array to provide the required magnetic field within the magnetic ink code bars. The rectangular elements 57 represent the orthogonally disposed coordinate code sensor or transducers which read the magnetic ink code bars printed on the map. The horizontal sensor reads the vertical bars representing the x-axis coordinates and the vertical one the y-axis coordinates. As can be seen, the sensors cover more than the width and height of a mel and thus some latitude or margin for error is permissible in positioning the stylus, since the logic is arranged so that the code sensors will respond only to a 6-bit code bracketed by start/stop bars. It can be seen from FIG. 5 that the mel marked 62 is the only one which meets this requirement.

The sub-mel indicators which provide the second stage of this plotting and reading operation comprises the array template 43 which is positioned directly over the map as shown in FIG. 2, together with the orthogonal coordinate indicators 45 and 47. The template comprises a 16 $\times$ 16 array of holes with the LED indicators 45 and 47 lined up with each row and column of the hole array. Thus the illumination of any two LEDs on different orthogonal LED arrays will specify one of the 256 holes. It should be noted that there are 8 LEDs equally spaced between adjacent start/stop bars, thus dividing each mel into 64 sub-mels to obtain the above-noted 512 line resolution. The three least significant binary bits are recalled from the field processor memory to illuminate one of the LEDs from each of the orthogonal arrays 45 and 47 to indicate the desired sub-mel. Two such LEDs 64 and 66 are shown with x's thereon indicating illumination. The template hole at the intersection of the indicated row and column within the mel labelled 62 is also shown with an "x" to indicate the proper sub-mel. The operator can insert a pencil or othe marking device through this hole to mark the map on which the template rests. The template can be made of transparent plastic so that the operator can see the map features through it. The logic circuitry of the field module places the sub-mel within the proper mel, in this case the mel designated as 62, by using the start and/or stop bars of the proper mel as reference points, together with the known distance along each of the LED arrays of the start and/or stop bars of the proper mel. Thus with the stylus positioned as in FIG. 5, it can be seen that the third LED in the horizontal array 45 and the sixth LED in the vertical array 47 are the first ones within the mel under consideration, 62. The circuitry provides means for sensing or measuring how far along each of the code sensors 57 the start bar of the mel being read is located and this information is used together with the 3 bit code to select the proper pair of LEDs for illumination.

The operator moves the stylus by trial and error to locate the proper mel and, as stated above, the display 51 on the top of the stylus shown in FIG. 2 can indicate when the proper x and y coordinates are reached. For example the display could blink or go out when the proper coordinate is reached. The preferred technique for operating the stylus is to locate each of the x and y coordinates in sequence by moving the stylus first parallel to one of the axes 39 to find the coordinate of that axis and then moving the stylus along the other axis to determine its coordinate.

Figure 6A:
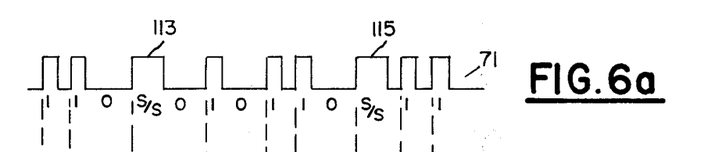
FIGS. 6a–6c and 7a–7c illustrate the structure and mode of operation of a surface acoustical wave device used as a coordinate code sensor or transducer.
Figure 6B:
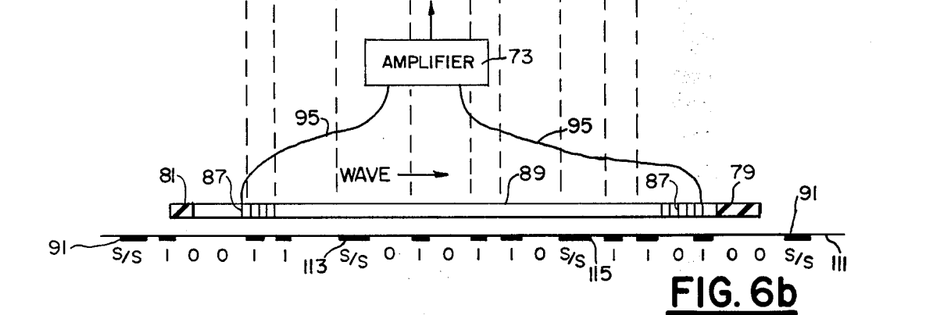
Figure 6C:
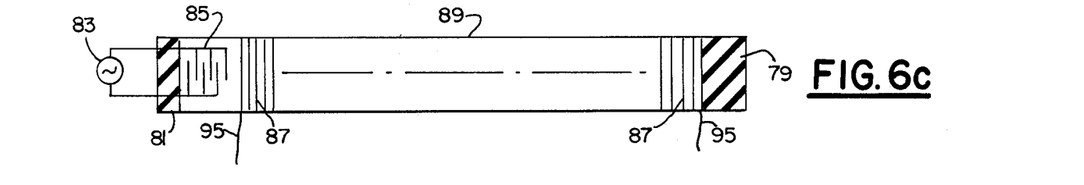
Figure 7A:
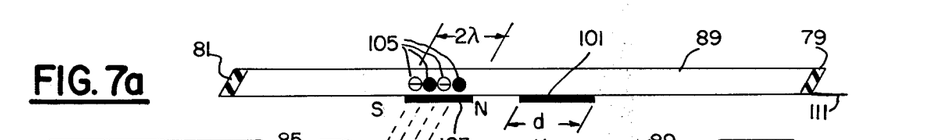
Figure 7B:
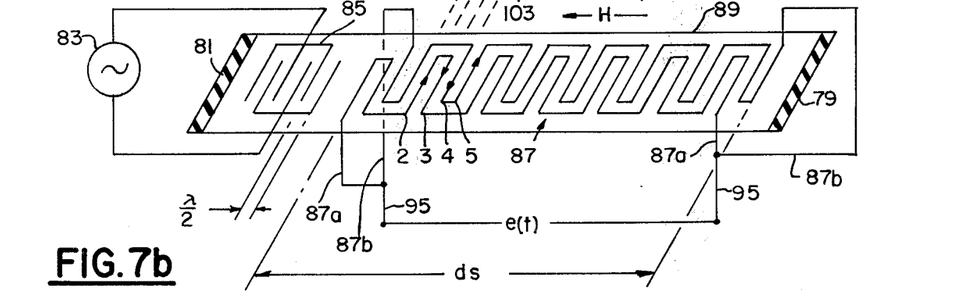

FIGS. 6a-6c and 7a-7c show how surface wave technology can be used to produce a propagating wave type of sensor for scanning and reading the spatially disposed magnetic ink codes on the map. FIG. 6b is a cross section of such a sensor positioned over a map 111, and FIG. 6c is a top view of the sensor. The sensor 89 consists of a flat rectangular bar of piezoelectric crystal material such as lithium niobate. An acoustic surface wave is launched down this piezoelectric crystal from left to right by means of an interdigital transducer 85 which comprises an array of deposited film conductors located on the top left surface of the crystal 89. The metal electrodes of transducer 85 comprise interleaved fingers, with adjacent fingers connected to opposite terminals of electric signal generator 83. As shown in FIG. 7b, the spacing between adjacent fingers of transducer 85 is made equal to one half the wavelength of the acoustic wave in the piezoelectric crystal. Since the velocity of propagation of surface acoustic waves in the crystal material mentioned is $3.48 \times 10^5$ cm/sec the proper spacing for the transducer finger can be easily obtained from the well known relationship between velocity, frequency and wavelength, using the frequency of the signal generator 83. The use of an interdigital transducer such as 85 permits the acoustic wave launched by each pair of fingers to add in phase to generator a stronger wave which propagates along the crystal to the right. The crystal 89 is provided with absorbers 79 and 81 on either end thereof. These absorbers prevent reflections of the surface waves incident thereon.

The magnets 55 mounted on the underside of the stylus as shown in FIG. 5, provide a magnetic field H, shown in FIG. 7, which magnetizes each of the magnetic ink code bars. For example, the code bar 103 of FIG. 7a will be magnetized across its width with north and south poles N and S, as shown in FIG. 7a. The signal coil 87 shown in detail in FIG. 7b comprises an array of conductors comprising thin films deposited on the top surface of crystal 89 over most of its length. As shown, this coil 87 comprises two parallel conducted conductors labelled as 87a and 87b, both of which are disposed in an intermeshed zig-zag fashion along the crystal. When the longitudinal compression wave launched by the transducer 85 travels down the crystal it successively imparts a back and forth motion to each of the conductors of the coil 87. As a result of the conductor interaction with the magnetic fields of the magnetized code bars, a time varying signal is generated in coil 87 each time that the acoustic wave passes a code bar, indicating a binary 1. If no such signal is produced as the wave passes through a code bar position, a binary 0 is indicated.

Figure 7C:
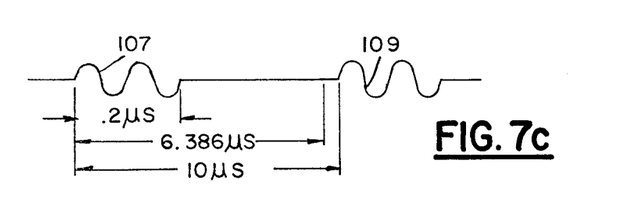

The arrangement of the conductors of signal coil 87 produces maximum signal voltage. This is illustrated in FIG. 7 which shows a code bar 103 on the underside of map 11 as an acoustic wave is passing therethrough. The generator 83 is assumed to produce 2 cycles of a 10 MHz sine wave each time a wave is to be launched as shown at 107 and 109 of FIG. 7c. The interval between the 2 cycle pulses of generator 83 is made equal to 10 microseconds. The figure of 6.386 microseconds in FIG. 7c represents the minimum time between pulses of generator 83 if the coil 87 is 2.222 cm long and the wave velocity $3.48 \times 10^5$ cm/sec, as stated above. In order to avoid interference or crosstalk between successive pulses, each pulse must completely pass the coil 87 and be absorbed in absorber 79 before the next pulse arrives at the beginning of coil 87. This 2 cycle wave is shown passing through code bar 103. The length of the 2 cycle wave is just long enough to span the width of code bar 103 and thus there will be two positive and two negative peaks within the code bar. These are indicated by the four symbols 105 in FIG. 7a. The solid symbols represent the positive peaks and the encircled dash symbols the negative peaks. The conductors 2, 3, 4 and 5 are the four signal coil conductors under code bar 103. Since the spacing of these conductors 2–5 is $\lambda/2$ of the acoustic wave, adjacent of these conductors will be moved in opposite directions by the passage of the acoustic wave. Thus conductors 4 and 5 will have oppositely poled voltages induced therein, indicated by the oppositely directed arrows on these conductors. Similarly, conductors 2 and 3 will also be moving in opposite directions to yield opposite induced voltages as shown by the arrows thereon, however these conductors are both moving under the influence of the sought magnetic field of the code bar 103 and hence each of the induced voltages will be opposite in polarity compared to the conductors 4 and 5 which are moving in the same direction. As shown, conductors 2 and 3 are both part of coil 87a, and conductors 4 and 5 are both part of coil 87b. This intermeshed arrangement of the two coils thus yield maximum signal voltage since all four of the induced voltages add to yield a single large signal at the terminals 95 of the coil 87. As shown in FIG. 6a, the terminals 95 of coil 87 are applied to amplifier 73 which connects to appropriate logic circuits which are part of the field processor of FIG. 1.

FIG. 6a shows the binary code represented by the coding of map 111 of FIG. 6b. The code coordinate sensor would in the position shown read the binary code between the start/stop bars 113 and 115. As can be seen, this code is the binary number 010110.

Figure 8:
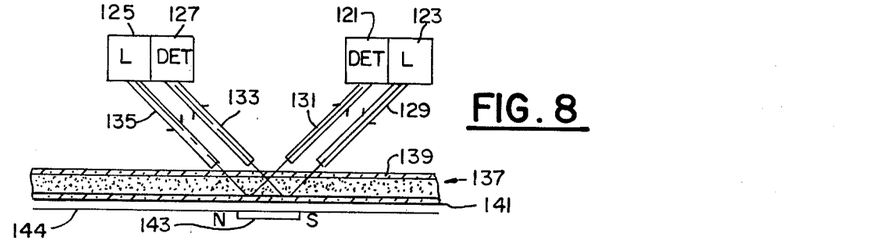
FIG. 8 illustrates the mode of operation of an electro-optical coordinate code sensor.

The principle of operation of an electro-optical coordinate code sensor is illustrated in FIG. 8, in which map 144 with magnetized code bar 143 thereon is shown being read by the electro-optical sensor. The sensor or transducer comprises a Bitter's solution sealed in glass or plastic. This solution comprises a colloidal suspension of fine iron particles of such size that the thermo-Brownian movement keeps them from settling. To further aid in keeping the particles in suspension, they are coated with a dispersing agent which keeps them from sticking together. The upper glass or plastic sealing member of the solution is made non-reflective, for example with a coating similar to those used on camera lenses. One surface of the lower sealing member is made reflective. Thus light incident on the upper member will normally encounter the dark opaque solution and reflection therefrom will be minimal. However if the solution is subjected to a magnetic field, for example that of a magnetized code bar, the ferrous particles thereof will migrate toward the north and south magnetic poles of code bar, which extend along the long edges thereof. The solution in this vicinity will then become almost transparent, so that incident light will be passed therethrough to be reflected from the lower sealing member.

In the diagram of FIG. 8, the sealed or encapsulated Bitter's solution is indicated at 137. The upper sealing member 139 comprises non-reflective glass or plastic and the lower member 141 has one of its broad surfaces reflective. A pair of light sources 123 and 125 are arranged to illuminate a slightly different area of the solution so that the sensitivity of the device will be maximized. The reflected light is sensed by a pair of phototransistors 121 and 127, fed by optical fibers 131, 133, 135 and 129. The use of optical fibers resolves the in-line space problem resulting from the fact that the diameter of the smallest available phototransistor is larger than the width of a mel code bar. Also, by using optical fibers, it is possible to stagger the mountings of the phototransistors to more efficiently utilize space, and several fibers can be grouped together and supplied from a common light source. Further, the use of an electro-optical transducer like that of FIG. 8 means that the unit is not subject to electromagnetic interference, and the assembly can be molded into a compact, strong and dust free unit.

Figure 9:
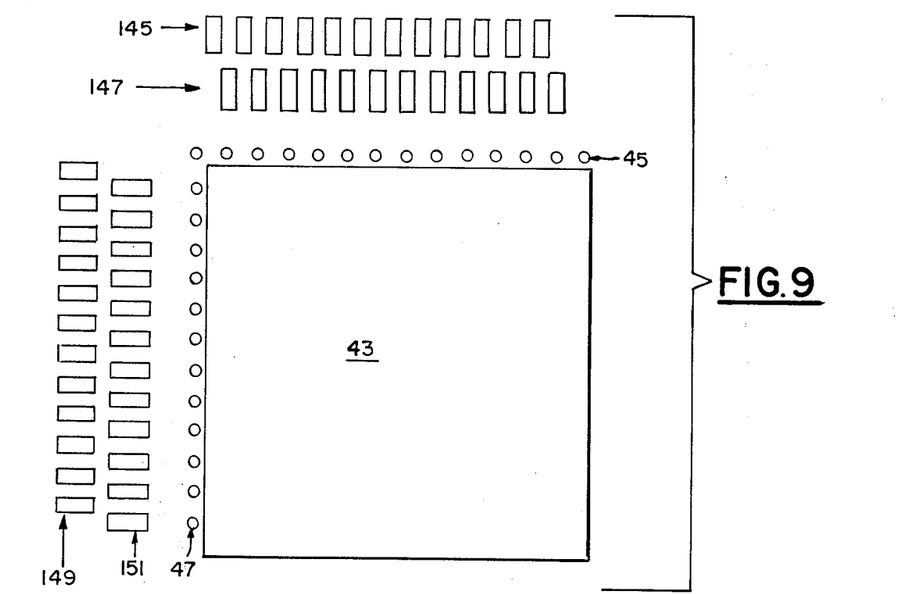
FIG. 9 shows how variable reluctance coordinate code sensors would be arranged in the stylus.
Figure 10:
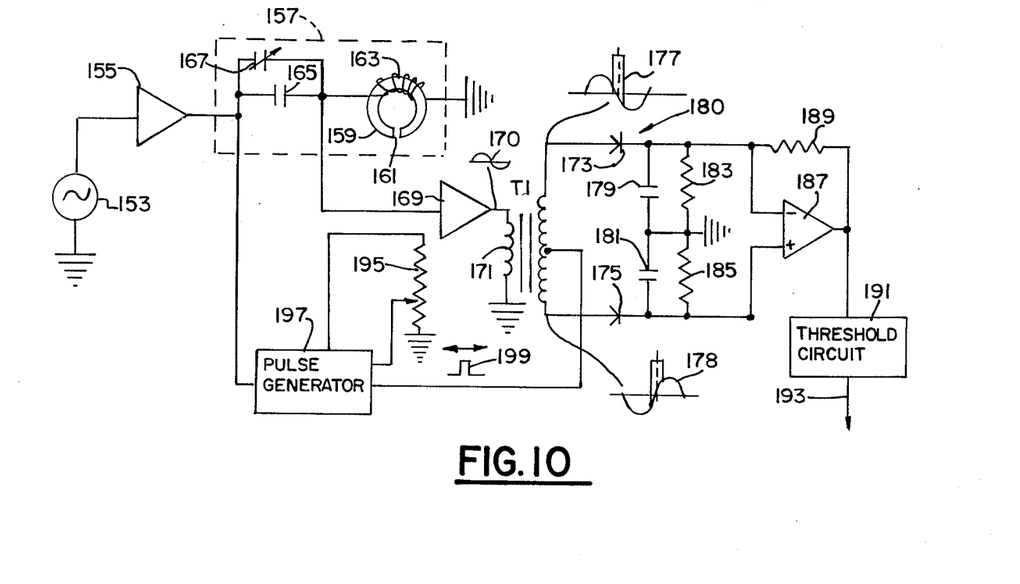
FIG. 10 shows circuitry for use with variable reluctance coordinate code sensors.
Figure 11:
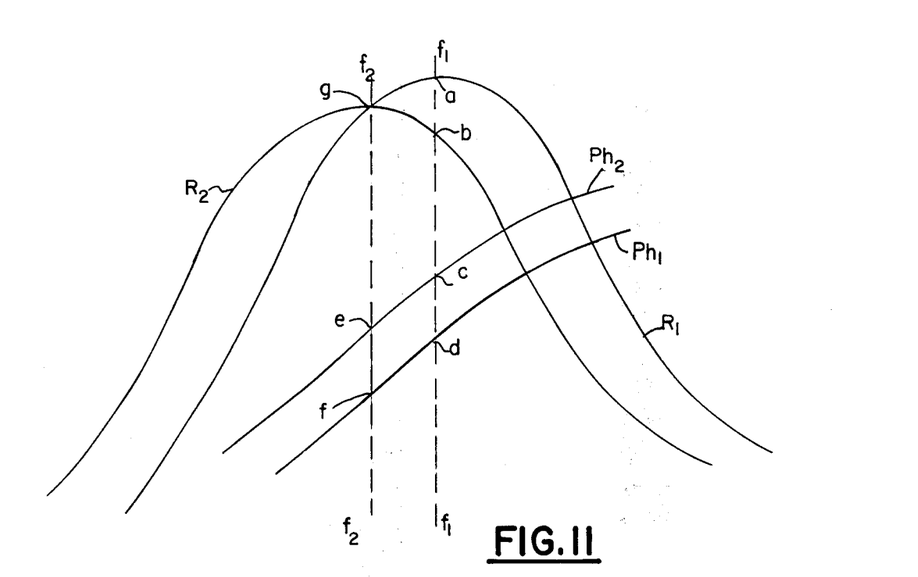
FIG. 11 are waveforms illustrating the operation of the circuit of FIG. 10.

FIGS. 9-11 illustrate the structure, circuitry and mode of operation of a variable reluctance type of coordinate code sensor in which an array of inductors wound on toroidal iron cores with air gaps therein are used to sense the presence of the magnetic code bars. The inductor coils are all supplied from a common source and are part of a series resonant circuit. The circuit is arranged to be series resonant in the presence of a magnetic code bar near the air gap. Thus in the absence of a code bar, the circuit is detuned from resonance and the phase change of the inductor coil voltage relative the common source phase is an indication of the presence or absence of the code bar. This arrangement results in minimal voltage change in the inductor voltage as the circuit is detuned and yields a higher output from the phase detector and hence greater circuit reliability.

FIG. 9 is a view like that of FIG. 5 showing how the electromagnetic sensors can be mounted in the stylus. In FIG. 9, 43 is the template array and 45 and 47 the LED arrays used to locate the proper sub-mels. The x coordinate sensor comprises two staggered rows, 145 and 147, of toroidal cores, as described above. The staggered arrangement means that all of the space along the x axis can be covered by these toroids, thus leaving no blank spaces. Each of the rows includes 12 toroids. Two similar rows of toroids 149 and 151 are arranged to sense the y coordinates of the map mel codes. The air gaps of the toroids are all placed near the bottom surface of the stylus so that they are close to the magnetic code bars on the maps.

FIG. 11 illustrates the mode of operation of the phase sensing circuitry shown in FIG. 10. In FIG. 11 the curve $R_1$ is the current vs. frequency response of a series resonant circuit. It will be assumed that $R_1$ is the response curve of a toroidal inductor when its air gap is not in the presence of a magnetic code bar and when the inductor is in series with a capacitor. The resonant frequency of such circuit is $f_1$. The curve labelled $Ph_1$ represents the phase of the inductor voltage under these conditions. If the air gap of the same toroidal inductor is then placed over a magnetic code bar, the inductance thereof increases and the Q will be reduced slightly, resulting in a current vs. frequency response curve of $R_2$, which has a lower peak, g, than does curve $R_1$. The curve $Ph_2$ is the phase curve corresponding to response curve $R_2$.

If the toroids were operated at resonance with the code bar not under the air gap, the signal source would operate at frequency $f_1$ and the inductor voltage drop would be proportional to point "a" or the peak of curve $R_1$. If the circuit were detuned by the presence of a code bar, the inductor voltage would drop to point "b" on curve $R_2$ and the phase would change from point "d" to "c". As stated above, this amplitude change would reduce the reliability of the phase detection circuitry used to detect the presence of code bars. In accordance with the invention, the signal source frequency is chosen as the resonant frequency of the series resonant inductor circuit with a code bar under the air gap. This frequency is $f_2$ in FIG. 11, which is the peak or resonant frequency of curve $R_2$. It can be seen that the curves $R_1$ and $R_2$ intersect at the peak "g" of curve $R_2$, thus when the resonant circuit is detuned from resonance by the absence of a code bar under the air gap, the inductor voltage magnitude does not change, but only the phase of such voltage changes, from point "e" to point "f". This lack of voltage change has the desired result mentioned above.

FIG. 10 is a simplified version of a circuit which can be used to detect such phase changes and hence the presence or absence of code bars. In FIG. 10 the elements within dashed box 157 are within the transducer or sensor head, the principal element therein being the toroidal powdered iron core 159, with inductor coil 163 wound thereon and having air gap 161. The capacitor 165 and trimmer 167 complete the series RLC circuit, the resistance of which is the inherent resistance of coil 163. This RLC circuit is adjusted for series resonance with the signal source 153, which may for example operate at 378 kHz, with a magnetic code bar adjacent the air gap, as explained above. The sensitivity of this type of variable reluctance sensor can be increased by increasing the toroidal core size and/or the number of turns of coil 163, however both of these expedients result in undesirable size increases. The circuit of FIG. 10 achieves a high sensitivity by converting the phase shift signal obtained when the resonant circuit is detuned into a sort of pulse amplitude modulated signal which is then integrated over several cycles of signal source 153 to obtain enhanced output. The integrated pulses are then applied to a threshold detector which determines the presence or absence of a code bar. With this circuitry, shown in FIG. 10, it is possible to detect codes printed with low density magnetic ink. Also, as noted previously, the variable reluctance sensors do not require that the code bars be magnetized.

Each one of the toroidal inductors of FIG. 9 would be provided with circuits like that of FIG. 10, except that signal source 153 may be common to all the sensors. The voltage across inductor coil 163 is amplified by amplifier 169 and applied to the primary of phase detector transformer $T_1$. Also, a portion of the output of signal source 153 is applied to pulse generator 197. Generator 197 contains circuitry for generating pulses, such as 199, which are synchronized with the frequency of signal source 153 and which are adjustable in timing by means of control 195 connected to generator 197. The pulses 199 may be produced by a multivibrator or equivalent device. The circuitry of phase detector 180 is more or less conventional and includes a pair of diodes 173 and 175 connected to the transformer secondary, and an integrating type filter comprising capacitors 179 and 181 and resistors 183 and 185. The pulse output of generator 197 is applied to the center tap of the transformer $T_1$. The control 195 is adjusted so that the center of the pulses coincide with the zero crossings of the sine wave voltage applied to the transformer from the inductor coil 163, with a code bar adjacent the air gap 161, and hence the RLC circuit in series resonance. This condition is shown in the waveforms 177 and 178, these being the composite waveforms at the ends of the transformer secondary resulting from the inductor sine wave voltage plus the pulses from generator 197. As can be seen, the sinusoidal portion of the waveforms 177 and 178 are 180° out of phase whereas the pulse portions of both are positive since the pulses are applied to the secondary center tap. Under these conditions the voltage applied to each of the detector diodes are equal and the detector output is zero. If the code bar is then removed from the vicinity of the air gap, the circuit is detuned from resonance and the phase of the voltage from the inductor, shown as waveform 170, will change, however the timing or phase of the pulses 199 from generator 197 will not change, thus the voltage passed by one of the diodes will increase and that passed by the other will decrease, resulting in a net voltage difference across integrating RC networks 183, 179, 185 and 181. This voltage difference is amplified by differential amplifier 187, the output of which is applied to threshold decision circuit 191. Threshold circuit 191, by voltage discrimination at its output 193, establishes either the presence of a code bar (binary 1), or the absence thereof (binary 0).

Figure 12:
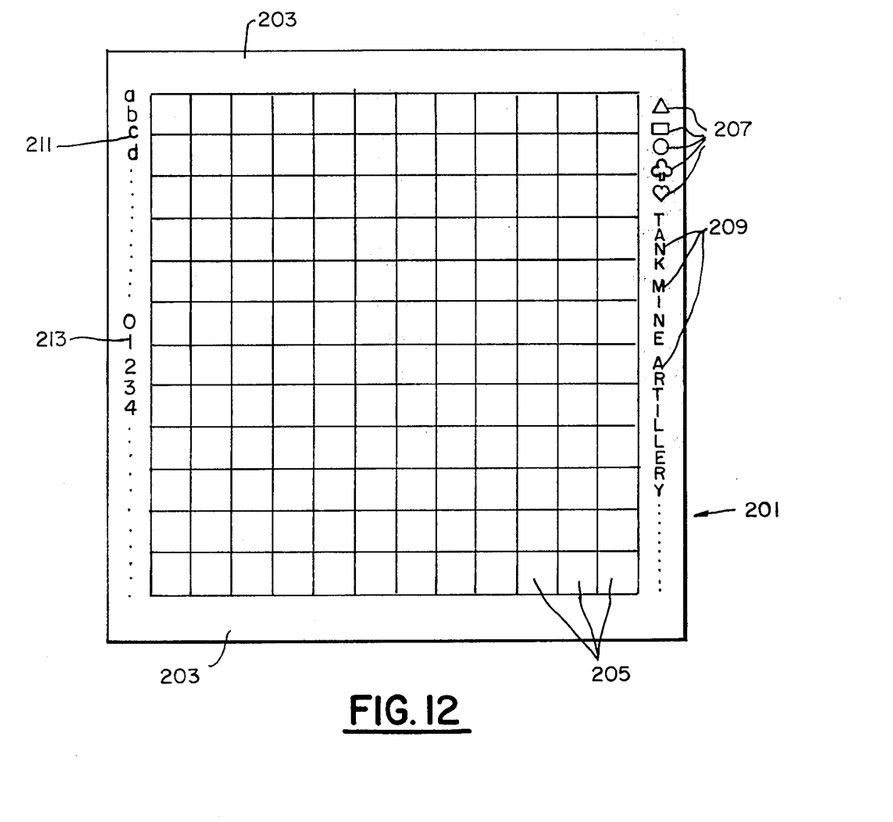
FIG. 12 shows a coded military map with alphanumerics and other symbols printed and encoded on the margins thereof.

FIG. 12 shows how a map may include, in addition to the coded mels described, coded symbols, words and/or alphanumerics which can be automatically read by the code sensors of the stylus. Thus by placing the stylus over the desired symbol, word or alphanumeric, the operator can automatically transmit this information along with a data point being sent to the higher echelon. In FIG. 12, the map 201 has most of its area divided into coded mels 205, but the border 203 has symbols 207, for example, a triangle, a rectangle, a circle, a clover leaf, and a heart. Appropriate words 209, for example, tank, mine, artillery, etc. may be included. Also, as shown at 211 and 213, the alphabet and a set of ten numbers may also be included. All of these symbols, etc. are both printed on the map face and in addition are magnetically coded under the visual symbol, word or alphanumeric.

The procedure for plotting data points by locating the proper sub-mel has already been described. In reading a data point for transmission, the stylus would be placed over the data point and one of the holes of the array template 43 lined up with the data point. One of the controls 49 on the stylus, shown in FIG. 2, would be a button arranged to step the illuminated LEDs of arrays 45 and 47 from the original of their coordinate system until two LEDs coinciding with the coordinates of the desired data point are reached. At this time another button or switch labelled "read" would be operated and the code sensors would then read out the proper mel and the proper sub-mel would be read out depending on which two LEDs were illuminated. This information would be sent to the field processor and from there to the higher echelon, as explained in connection with FIG. 1.

While the invention has been described in connection with illustrative embodiments, obvious variations thereof may occur to those skilled in this art, hence the invention should be limited only by the scope of the appended claims.

I claim:

1. Apparatus for quickly and accurately exchanging military information between military units, comprising; a map divided into a plurality of map elements or mels, each of said mels being encoded in binary digital form to indicate the x and y coordinates of each said mel, each of said mels being divided into a plurality of sub-mels, means to encode data points to be plotted on said map into binary digital words in which a first group of binary digits of greater significance represent the mel in which the said data point is located and in which the remainder of said binary digits comprises a second group of digits of less significance representing the sub-mel at which said data point is located, one such binary word being provided for each x and y coordinate of each said data point, said apparatus further comprising a manually operated stylus comprising a pair of code sensors adapted to read said first groups of binary digits encoded on said mels, and further apparatus on said stylus to locate the proper sub-mel within the proper mel by utilizing said second group of binary digits.

2. The apparatus of claim 1 wherein said map is divided into 4,096 mels and each of the x and y coordinates of each such mel is represented by a 6 digit binary number, and wherein each said mel is divided into 64 sub-mels, each such sub-mel being represented by a pair of coordinates each represented by a 3 bit binary number.

3. The apparatus of claim 2 wherein said proper sub-mel is located by means of an array template comprising a flat plate with an orthogonal array of holes therein with 8 holes spanning the width and height of each of said mels, further comprising orthogonal arrays of lights along two sides of said template, said lights being aligned with the rows and columns of said hole array, and whereby two of said lights from different ones of said orthogonal arrays of lights will be illuminated in response to said second group of digits to indicate the precise location of said sub-mel.

4. The apparatus of claim 1 wherein said mels are each coded by a pair of binary digital codes arranged orthogonally to each other and each code group comprises a plurality of magnetic ink bars representing the x and y coordinates of each said mel.

5. The apparatus of claim 1 wherein each of said mels is identified by a pair of 6 bit binary numbers representing the x and y coordinates of said mel, and wherein each mel is encoded with said pair of 6 bit numbers in a bar code in magnetic ink, with each of said pair of numbers being arranged orthogonally, all of the x coordinates being represented by vertical code bars and all of the y coordinates being represented by horizontal code bars.

6. The apparatus of claim 5 wherein said magnetic code bars are affixed to the back or underside of said map.

7. Apparatus capable of accurately plotting information received in binary form on maps, comprising; maps having x and y coordinates thereof encoded thereon in digital machine-readable form, a stylus adapted to be moved over the surface of said maps, said stylus comprising coordinate code sensors adapted to automatically read the coordinates of said maps by sensing the binary codes thereon, and wherein circuitry is provided for comparing said received binary codes with the codes read by said sensors to indicate the proper x and y coordinates at which said information is to be plotted.

8. Apparatus capable of plotting information on maps with high accuracy from received binary digital information comprising a plurality of binary code words indicative of the data points to be plotted, comprising maps which are divided into a number of map elements or mels with each mel being coded in machine readable form to indicate the x and y coordinates of the mel, and a manually operated stylus comprising code sensors adapted to read the codes of said mels, and wherein said binary code words are split into two groups, the first group comprising the more significant bits of said words and said first group being used in conjunction with said coordinate code sensors to locate the mel in which said data points are to be plotted, and in which said stylus includes further automated means responsive to said second group of the digits of said binary words of lesser significance to accurately locate said data points within said mels.

9. The apparatus of claim 8 wherein said first group of binary digits contains 6 bits and said second group contains 3 bits and wherein said automated means comprises a template with rows and columns of holes therein and two orthogonally disposed arrays of light emitting diodes arranged to indicate the precise location of said data points as the intersection of one of said rows and columns.

10. A method of plotting data points of maps wherein the x and y coordinates of said data points are specified by means of a pair of binary words comprising first and second groups of binary digits, in which the plotting is accomplished in two steps, the first step comprising the location by manually moveable means of the general area or mel of the data points to be plotted by sensing coordinate codes printed on said maps within each of said mels and comparing said coordinate codes to said first group of binary digits, the second step comprising the use of said second groups of binary digits to accurately locate said data point to be plotted within said mel.

11. Apparatus capable of accurately plotting and reading information to and from maps, comprising; maps having the x and y coordinates thereof encoded thereon in digital machine-readable codes, a stylus adapted to be moved over the surface of said maps, said stylus comprising a pair of coordinate code sensors adapted to automatically read the coordinates of said maps by sensing said machine-readable codes, said sensors each comprising a surface acoustical wave device comprising a piezoelectric crystal of flat elongated shape, said crystal having a signal coil on one broad surface thereof and a transducer at one end thereof adapted to launch surface acoustic waves down said crystal, said codes being in the form of magnetic ink binary code bars affixed to the backs of said maps, means to magnetize said code bars in the vicinity of said sensors whereby a voltage will be induced in said signal coil when said acoustic wave passes a magnetized code bar, and circuit means connected to said signal coil to sense the presence or absence of said voltage to indicate either a binary 1 or binary 0 at the position of each binary digit of said machine-readable code.

12. The apparatus of claim 11 wherein said transducers launch acoustic waves of 2 cycles with such a frequency that two wavelengths thereof in the crystal are equal to the width of said code bars, and wherein said signal coil is split into two parallel portions with the spacing thereof arranged to yield maximum induced voltage from said 2 cycle acoustical waves.

13. The apparatus of claim 11 wherein the x coordinates of said maps are encoded thereof by means of vertical code bars and the y coordinates by means of horizontal code bars and wherein one of said sensors is adapted to read said vertical code bars and the other of said sensors is adapted to read said horizontal bars.

14. Apparatus capable of accurately plotting digitally received information on maps, comprising; maps encoded with digital machine-readable codes representing x and y coordinates thereof, coordinate code sensors adapted to automatically read said x and y coordinates, said sensors comprising orthogonally disposed surface acoustic wave devices each comprising a flat, elongated piezoelectric crystal with a signal coil on one surface thereof and a transducer at one end thereof, said transducer adapted to launch an acoustic wave down said transducer whereby the surface thereof will be caused to move back and forth as said wave passes, causing said signal coil to move in similar fashion, said machine-readable codes comprising magnetized code bars which will induce voltage in said signal coil due to said back and forth motion.

15. Apparatus capable of accurately plotting digitally received information on maps, comprising; maps encoded with digital machine-readable codes in the form of magnetized ink code bars representing the x and y coordinates of said map, a coordinate code sensor adapted to automatically read said x and y coordinates, said sensor comprising a pair of orthogonally disposed electro-optical sensors, each comprising an encapsulated Bitter's solution comprising a colloidal suspension of ferrous particles which normally render said solution opaque and which solution will become transparent in the presence of said magnetized code bars, and said code sensors further comprising light sources and optical detectors adapted to measure the transparency of said solution as an indication of the presence or absence of a code bar.

16. The apparatus of claim 15 wherein optical fibers are used to convey the output of said light sources to said solution and to convey the light reflected therefrom to said optical detectors, and wherein two or more such fibers are used to illuminate different adjacent portions of said solution to obtain increased sensitivity.

17. Apparatus capable of accurately reading digital machine-readable codes affixed to the underside of maps, said codes representing the x and y coordinates of map elements or mels, each mel including two groups of binary digits, each group comprising a plurality of magnetic ink code bars, with each group of bars arranged orthogonally to each other, coordinate code sensors adapted to automatically read said groups of binary digits, said sensors comprising orthogonally disposed arrays of variable reluctance devices, each of said devices comprising a toroidal iron core with an inductor coil wound thereon and an air gap therein, means to dispose all of said air gaps adjacent said maps, and circuitry connected to each said inductor coil to sense the presence or absence of said magnetic code bars adjacent to said air gaps to indicate a binary 1 or a binary 0 of said codes.

18. The apparatus of claim 17 in which said circuitry comprises a signal source and a capacitor in series with said inductor coil said capacitor and inductor being series resonant with one of said code bars adjacent the air gap of said iron core, and a phase detector connected to said inductor coil and to said signal source, the output of said phase detector indicating the presence or absence of a code bar adjacent said air gap.

19. The apparatus of claim 17 wherein said circuitry comprises a signal source and a capacitor in series with said inductor coil to form a resonant circuit with said bars adjacent said air gap of said iron core, a plurality of phase detectors equal to the number of said variable reluctance devices, each said phase detector comprising a pair of diodes with their anodes connected to opposite ends of a center-tapped transformer, means to apply said signal source across said resonant circuit, means to apply the voltage across said inductor coil to the primary of said transformer, means to apply said signal source to a pulse generator adapted to generate a pulse of adjustable timing but locked in frequency to said signal source, means to apply the output of said pulse generator to the center tap of said transformer secondary, said phase detectors further comprising a pair of resistor-capacitor integrating filters connected to each of said diodes and balanced with respect to ground, whereby the output of said phase detector will be zero if the average voltage applied to each of said diodes is equal.

20. A map divided into a plurality of map elements or mels of equal area, each such mel being coded with a machine-readable binary code to indicate the x and y coordinates of each such mel, each such mel having two groups of binary digits therein in the form of magnetic ink code bars, one of said groups comprising a plurality of vertical magnetic ink code bars for indicating the x coordinate of each such mel and the second of said groups comprising a plurality of horizontal magnetic ink code bars for indicating the y coordinate of each such mel.

21. The map of claim 20 further including a border extending around the edges thereof, said border including machine-readable symbols, words and alpha-numerics which are also readable by eye.

22. The map of claim 20 wherein the number of said mels is 4,096 and wherein each of said groups of binary digits comprises 6 code bars.

23. The apparatus of claim 20 further comprising a stylus adapted to be moved over the surface of said map, said stylus having a pair of coordinate code sensors thereon adapted to read said binary digits.

* * * * *